United States Patent [19]
Grainger

[11] 3,792,688
[45] Feb. 19, 1974

[54] ANTI-POLLUTION GASIFIED LIQUID FUEL SYSTEM

[76] Inventor: Lewis M. D. Grainger, Rt. 1, Glen Allen, Va. 23060

[22] Filed: Nov. 9, 1972

[21] Appl. No.: 304,932

[52] U.S. Cl............ 122/248, 122/136 R, 122/235 R, 123/122 F, 261/124, 431/215
[51] Int. Cl............................................. F22b 37/10
[58] Field of Search.......... 122/248, 250 R, 235 R, 122/136 R; 431/210, 215; 261/122, 124, 145; 55/256; 123/134, 122 F; 280/5; 137/568, 137/571, 575

[56] References Cited
UNITED STATES PATENTS

| | | |
|---|---|---|
| 1,634,022 | 6/1927 | Dalton, Sr.......................... 261/124 |
| 3,498,029 | 3/1970 | Feuersanger........................ 261/124 |
| 3,728,092 | 4/1973 | Gorman, Jr. ...................... 123/122 F |
| 1,732,505 | 10/1929 | Dawson ............................. 137/576 |
| 2,314,140 | 3/1943 | Graziano......................... 123/122 F |

Primary Examiner—Kenneth W. Sprague
Assistant Examiner—James C. Yeung
Attorney, Agent, or Firm—Elton H. Brown, Jr.

[57] ABSTRACT

A system in which liquid fuel is gasified by being heated and having air bubbled therethrough to produce a gaseous fuel which is fed directly to an internal combustion engine or may be burned in a steam boiler producing steam to operate a turbine, a reciprocating steam engine or any other steam actuated device.

6 Claims, 6 Drawing Figures

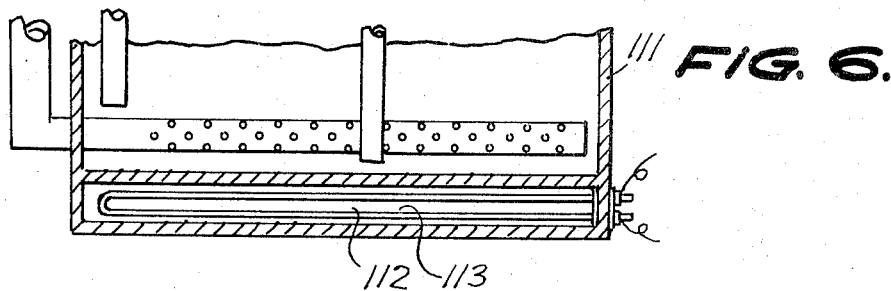
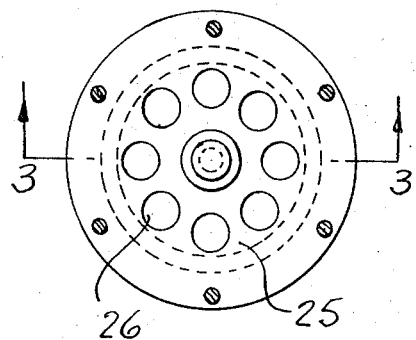
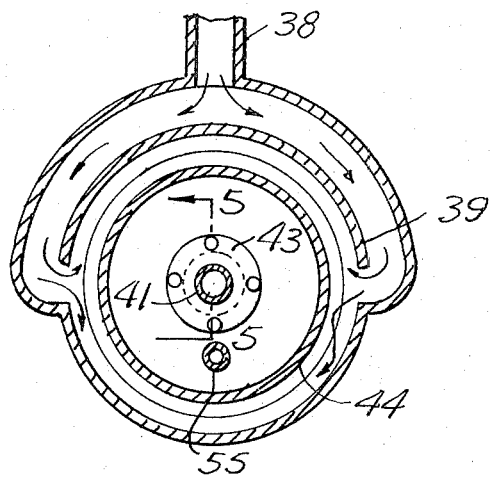
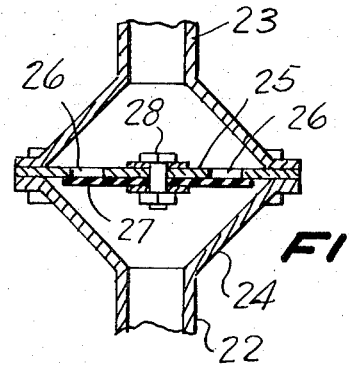
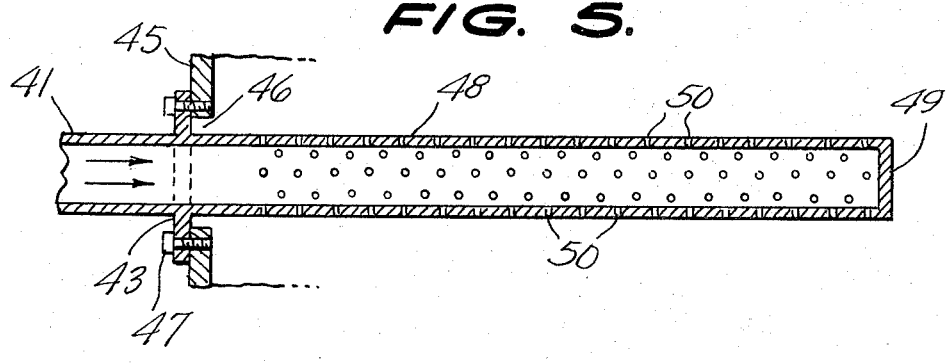

ANTI-POLLUTION GASIFIED LIQUID FUEL SYSTEM

BACKGROUND OF THE INVENTION

1. Field of the Invention

The present invention relates to anti-pollution fuel systems utilizing gasified liquid fuel.

2. Summary of the Invention

The fuel tank of the system is heated first by an electric heater to begin the gasification followed by exhaust gas heat or in a modified form completely by an electric heater and simultaneously air is bubbled through the liquid fuel to produce a gaseous fuel which is fed directly to the carburetor of an internal combustion engine or to the burner of a steam generator with the steam being used to drive a reciprocating steam engine or a turbine.

The primary object of the invention is to provide an anti-pollution power system utilizing gasified liquid fuel.

Other objects and advantages will become apparent in the following specification when considered in the light of the attached drawings.

BRIEF DESCRIPTION OF THE DRAWINGS

FIG. 2 is a horizontal sectional view, taken along the line 2—2 of FIG. 1, looking in the direction of the arrows;

FIG. 3 is a vertical sectional view, taken along the line 3—3 of FIG. 2, looking in the direction of the arrows;

FIG. 4 is a transverse sectional view, taken along the line 4—4 of FIG. 1, looking in the direction of the arrows;

FIG. 5 is a longitudinal sectional view, taken through the gas burner; and

FIG. 6 is a fragmentary view similar to FIG. 1 illustrating a modified form of the invention.

DESCRIPTION OF THE PREFERRED EMBODIMENT

Figure 1:
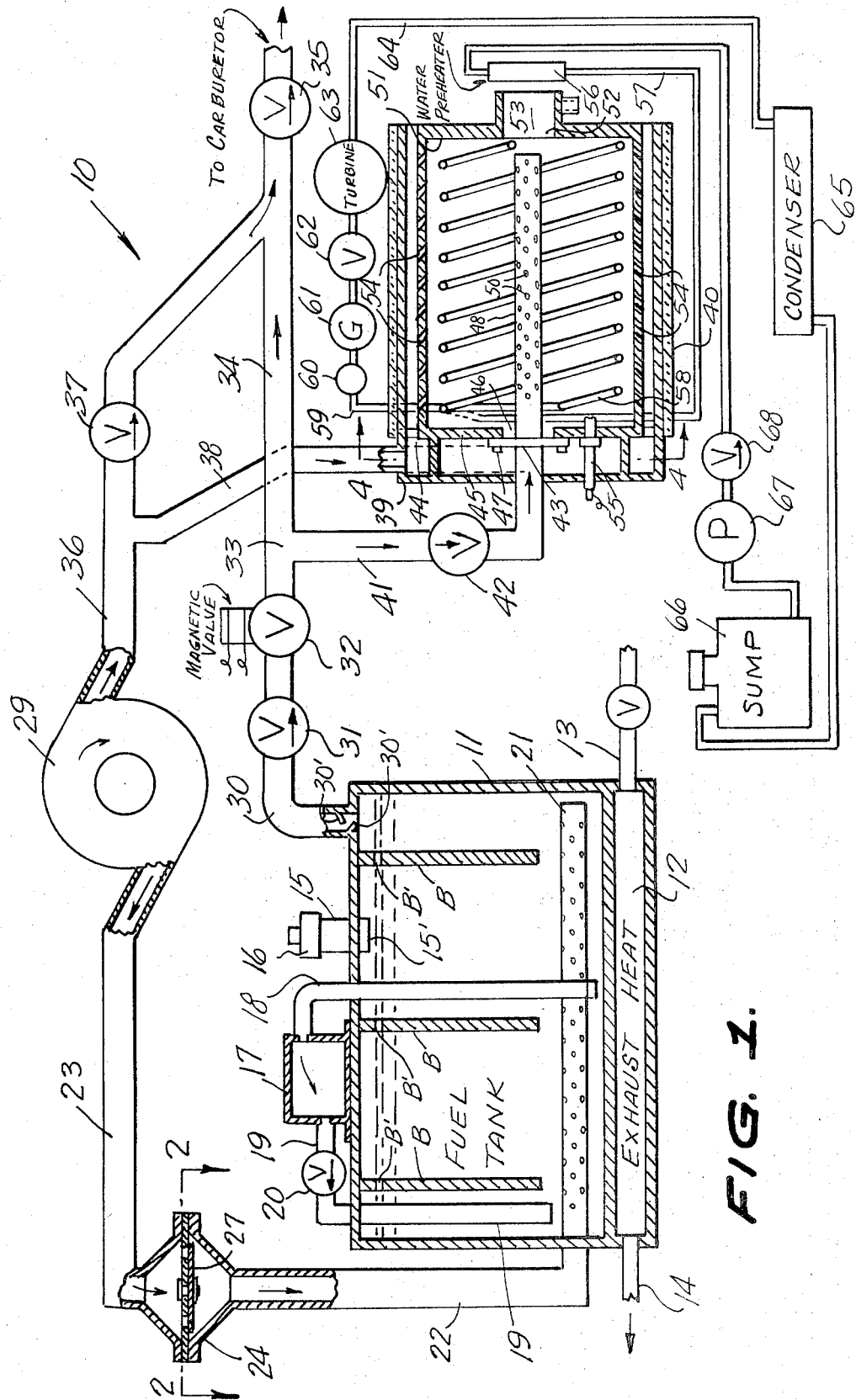
FIG. 1 is a side elevation of the invention shown partially broken away and in section for convenience of illustration.

Referring now to the drawings in detail, wherein like reference characters indicate like parts throughout the several figures, the reference numeral 10 indicates generally an anti-pollution power system constructed in accordance with the invention.

The anti-pollution power system 10 includes a completely sealed fuel tank 11 having a sealed compartment 12 forming a part thereof to receive exhaust gases from an internal combustion engine through an exhaust pipe 13 with the exhaust gases being discharged through a tail pipe 14 extending from the compartment 12. A fuel filler neck 15 is connected to the tank 11 and is closed by a seal filler cap 16 provided with an excess pressure relief valve to serve as a safety should the pressure in the tank 11 exceed safety limits. The fuel filler neck 15 has an extension 15' which projects below the top of the tank 11 to prevent the tank 11 from becoming completely filled with liquid fuel. Thus space for the formation of gaseous fuel is always available at the top of the tank 11.

An expansion tank 17 is secured to the top of the tank 11 and a pipe 18 extends from a point adjacent the bottom of the tank 11 into the top of the expansion tank 17. The drain pipe 19 extends from the bottom of the expansion tank 17 through a one way check valve 20 discharging adjacent the bottom of the tank 11. A perforated bubble pipe 21 extends longitudinally across the bottom of the tank 11 and is connected to an air supply pipe 22 at one end thereof. The air supply pipe 22 is connected to an air conduit 23 through a one way valve 24 interposed therebetween. The one way valve 24 includes a transverse plate 25 having a plurality of apertures 26 formed therein and covered on the down stream side with a flexible diaphragm 27 secured thereto by a bolt 28. Air flowing from the air conduit 23 to the air supply pipe 22 forces the diaphragm 27 downwardly away from the apertures 26 but reversed flow is prevented since movement of air in a reversed direction would immediately cause the diaphragm 27 to seal against the aperture 26. A rotary air blower 29 is connected to the air conduit 23 and supplies air thereto under pressure.

A fuel line 30 extends from the top of the fuel tank 11 and has a one way check valve 31 mounted therein to prevent back flow or back fire from reaching the fuel tank 11. Baffles 30' in the fuel line 30 prevent liquid fuel from being splashed into the fuel line 30 to eliminate the possibility of the liquid fuel from becoming entrained in the gaseous fuel moving through the fuel line 30. A magnetic valve 32 is also interposed in the fuel line 30 to be opened only when the electric circuits involved are energized and is closed at all other times. The fuel line 30 has a tee 33 formed therein and a fuel line branch 34 extends to a one way valve 35 to the carburetor of an internal combustion engine. An air conduit 36 extends from the air blower 29 through a valve 37 and is coupled to the branch fuel line 34 to mix additional air therewith for combustion in the engine. A branch air conduit 38 extends from the air conduit 36 to a generally cylindrical housing 39. The housing 39 has an insulating cover 40 extending thereabout.

A branch fuel line 41 extends from the tee 33 through a one way valve 42 and then through the axial center of the housing 39 and carries a flange 43 rigidly secured thereto. A combustion chamber 44 is mounted within the housing 39 and spaced inwardly therefrom having an end wall 45 with an axial opening 46 formed therein. The flange 43 is secured to the end wall 45 by a plurality of bolts 47 and a tubular gas burner 48 extends into the combustion chamber 44 axially thereof. The tubular gas burner 48 as can be clearly seen in FIG. 5 is closed at 49 at its inner end and has a plurality of gas outlets 50 formed throughout its length. The combustion chamber 44 has a second end wall 51 with an outlet opening 52 formed therein carrying an outlet nozzle 53. The combustion chamber 44 has a plurality of tangentially and inwardly sloping air inlet bores 54 extending therethrough to permit a flow of air from the housing 39 to flow therein to mix with the gas flowing out of the apertures 50 to provide complete combustion thereof. The bores 54 sloping inwardly and tangentially cause a tremendous turbulence within the combustion chamber 44 to assist in the combustion. An electric ignitor 55 extends through the end wall 45 and the housing 39 to ignite the gas within the combustion chamber 44 at the beginning of a heating cycle.

A water pre-heater 56 is positioned in the stream of the exhaust gases flowing out the exhaust nozzle 53 to pre-heat water flowing through a pipe 57 to a pair of stream coils 58 extending spirally in the combustion chamber 44. Steam from the coils 58 flows through a steam pipe 59 to a buffer 60, pressure gauge 61, control valve 62, to a turbine 63 or in the alternative a reciprocating steam engine. Exhaust steam flows through an exhaust steam pipe 64 to a condensor 65 and from there to a sump 66. A pump 67 is supplied from the sump 66 and forces the water through a one way valve 68 to the water pre-heater 56. The steam system of the present invention is closed and occasional additions of water to the sump 66 is all that is required.

While I have disclosed the use of water in the steam system it should be understood that any combination of water and emulsifiers may be used as desired.

In FIG. 6 a modified form of the invention is illustrated wherein the fuel tank 111 has a compartment 112 at the base thereof with an electric heating element 113 mounted in the compartment 112 to heat the fuel in the tank 111. The compartment 112 and heating element 113 replace the exhaust heat system of the form of the invention illustrated in FIG. 1 with no other changes of any kind occurring.

In the use and operation of the invention the fuel in the fuel tank 11 is first heated by an electric heater (not shown) to begin gasification followed by the exhaust gase heat in the compartment 12. Air is bubbled in through the bubble pipe 21 to provide a gaseous fuel mixture flowing through the fuel line 30 to supply heat to the steam generator or fuel to the carburator. An air blower 29 provides air under pressure to the bubble pipe 21 and also to the fuel line 34 as well as to the outer housing in the steam generator to provide the required air for the system.

No evaporation of fuel reaches the atmosphere and over expansion of fuel in the tank 11 moves into the expansion tank 17 rather than being wasted. After the pressure falls in the fuel tank 11 gas in the expansion tank 17 can flow through the pipe 19 and valve 20 back to the fuel tank 11. Conventional anti-splash baffles B having circulation bores B' in their upper ends are positioned in the tank 11.

Having thus described the preferred embodiment of the invention it should be understood that numerous structural modifications and adaptations may be resorted to without departing from the spirit of the invention.

What is claimed is:

1. A power system utilizing gasified liquid fuel comprising a fuel tank, means for heating the fuel tank, means bubbling air through the fuel in the fuel tank, a fuel line extending from the top of the fuel tank for conducting gasified-liquid fuel mixed with air, means for supplying air under pressure to the means for bubbling air through the fuel in the fuel tank, a steam generator including a combustion chamber, an outer housing surrounding said combustion chamber in spaced relation thereto, means for supplying air under pressure to said outer housing, a plurality of inwardly and tangentially sloping apertures in said combustion chamber for conducting air from said outer housing into the inner portion of said combustion chamber, a gas burner in said combustion chamber connected to the fuel line extending from said fuel tank, and means in said combustion chamber for generating steam therein.

2. A device as claimed in claim 1 wherein the means for heating air in the fuel tank comprises an exhaust gas heat exchanger connected to said fuel tank.

3. A device as claimed in claim 1 wherein the means for heating the fuel tank comprises an electric heater secured to said fuel tank.

4. A device as claimed in claim 1 including an expansion tank secured to said fuel tank, means extending from the bottom portion of said fuel tank to said expansion tank for conducting liquid fuel under pressure from said fuel tank to said expansion tank, and means extending from said expansion tank to the lower portion of said fuel tank for conducting liquid fuel from said expansion tank back to said fuel tank when the pressure in said fuel tank is lowered.

5. A device as claimed in claim 1 wherein the means in said combustion chamber for generating steam comprises a sloping spiral steam coil extending longitudinally therein.

6. A device as claimed in claim 5 including a water pre-heater for pre-heating water prior to entry into said steam coil.

* * * * *